United States Patent
Lin et al.

(10) Patent No.: US 11,416,106 B2
(45) Date of Patent: Aug. 16, 2022

(54) ELECTRONIC DEVICE WITH TOUCH SENSING FUNCTION AND ELECTRODE STRUCTURE FOR TOUCH SENSING

(71) Applicant: TPK Touch Solutions (Xiamen) Inc., Fujian (CN)

(72) Inventors: Ming Chuan Lin, Taichung (TW); Wenhung Wang, Taichung (TW); Chuan Chih Fu, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

(21) Appl. No.: 17/121,941

(22) Filed: Dec. 15, 2020

(65) Prior Publication Data
US 2022/0187952 A1     Jun. 16, 2022

(51) Int. Cl.
   *G06F 3/044*     (2006.01)
   *G06F 3/041*     (2006.01)

(52) U.S. Cl.
   CPC .......... *G06F 3/0446* (2019.05); *G06F 3/0412* (2013.01); *G06F 2203/04111* (2013.01)

(58) Field of Classification Search
   CPC .............. G06F 3/0446; G06F 3/0412; G06F 2203/04111
   See application file for complete search history.

(56) References Cited

U.S. PATENT DOCUMENTS

| | | | |
|---|---|---|---|
| 2017/0160866 A1* | 6/2017 | Tsai | G06F 3/0412 |
| 2018/0277029 A1 | 9/2018 | Lee et al. | |
| 2020/0042116 A1* | 2/2020 | Li | G06F 3/0412 |

FOREIGN PATENT DOCUMENTS

| | | |
|---|---|---|
| TW | I529585 B | 4/2016 |
| TW | I611323 B | 1/2018 |
| TW | M609451 U | 3/2021 |

* cited by examiner

*Primary Examiner* — Peter D McLoone
(74) *Attorney, Agent, or Firm* — Cooper Legal Group, LLC

(57) ABSTRACT

An electronic device with touch sensing function is provided, which includes first touch electrodes, second touch electrodes, and pixel circuits. The first touch electrodes are in parallel with a Y-axis, in which each first touch electrode includes first electrode blocks and bridge patterns. The first electrode blocks are coupled with the bridge patterns in series. The second touch electrodes are in parallel with an X-axis, in which each second touch electrode includes second electrode blocks and connection patterns. The second electrode blocks are coupled with the connection patterns in series and the X-axis is substantially perpendicular to the Y-axis. The pixel circuits are arranged as corresponding to the first touch electrodes and the second touch electrodes in a projection direction. The pixel circuits are configured to receive one or more voltages from the first touch electrodes and the second touch electrodes.

19 Claims, 8 Drawing Sheets

ELECTRONIC DEVICE WITH TOUCH SENSING FUNCTION AND ELECTRODE STRUCTURE FOR TOUCH SENSING

BACKGROUND

Technical Field

The present disclosure relates to an electronic device with touch sensing function and a related electrode structure. More particularly, the present disclosure relates to an in-cell touch electronic device and an in-cell touch electrode structure.

Description of Related Art

In-cell touch technology fabricates a touch module inside a display, so that the overall device has the advantages of lightness and high brightness. The operating principle of common in-cell touch displays is to perform self-capacitive touch sensing through multiple matrix-arrangement rectangular touch electrodes, in which each electrode requires an independent wire to transmit the sensing result to a touch chip. However, with the gradual increase in demand for touch resolution, the number of channels of the conventional touch chip is insufficient to support this design, and the touch electrodes are easily short-circuited to each other due to the numerous and dense wiring. In addition, a device using self-capacitive touch sensing technology is not suitable for a stylus.

SUMMARY

The disclosure provides an electronic device with touch sensing function, which includes multiple first touch electrodes, multiple second touch electrodes, and multiple pixel circuits. The multiple first touch electrodes are in parallel with a Y-axis, in which each first touch electrode includes multiple first electrode blocks and multiple bridge patterns. The multiple first electrode blocks are coupled with the multiple bridge patterns in series. The multiple second touch electrodes are in parallel with an X-axis, in which each second touch electrode includes multiple second electrode blocks and multiple connection patterns. The multiple second electrode blocks are coupled with the multiple connection patterns in series, in which the X-axis is substantially perpendicular to the Y-axis. The multiple pixel circuits are arranged as corresponding to the multiple first touch electrodes and the multiple second touch electrodes in a projection direction. The multiple pixel circuits are configured to receive one or more voltages from the multiple first touch electrodes and the multiple second touch electrodes.

The disclosure provides an electrode structure for touch sensing, which includes multiple first touch electrodes and multiple first touch electrodes. The multiple first touch electrodes are in parallel with a Y-axis, in which each first touch electrode includes multiple first electrode blocks and multiple bridge patterns. The multiple first electrode blocks are coupled with the multiple bridge patterns in series. The multiple second touch electrodes are in parallel with an X-axis, in which each second touch electrode includes multiple second electrode blocks and multiple connection patterns. The multiple second electrode blocks are coupled with the multiple connection patterns in series, in which the X-axis is substantially perpendicular to the Y-axis. When the multiple first touch electrodes and the multiple second touch electrodes are configured to provide one or more voltages to multiple pixel circuits, the multiple first touch electrodes and the multiple second touch electrodes are arranged as corresponding to the multiple pixel circuits in a projection direction.

It is to be understood that both the foregoing general description and the following detailed description are by examples, and are intended to provide further explanation of the disclosure as claimed.

DETAILED DESCRIPTION

Figure 1:
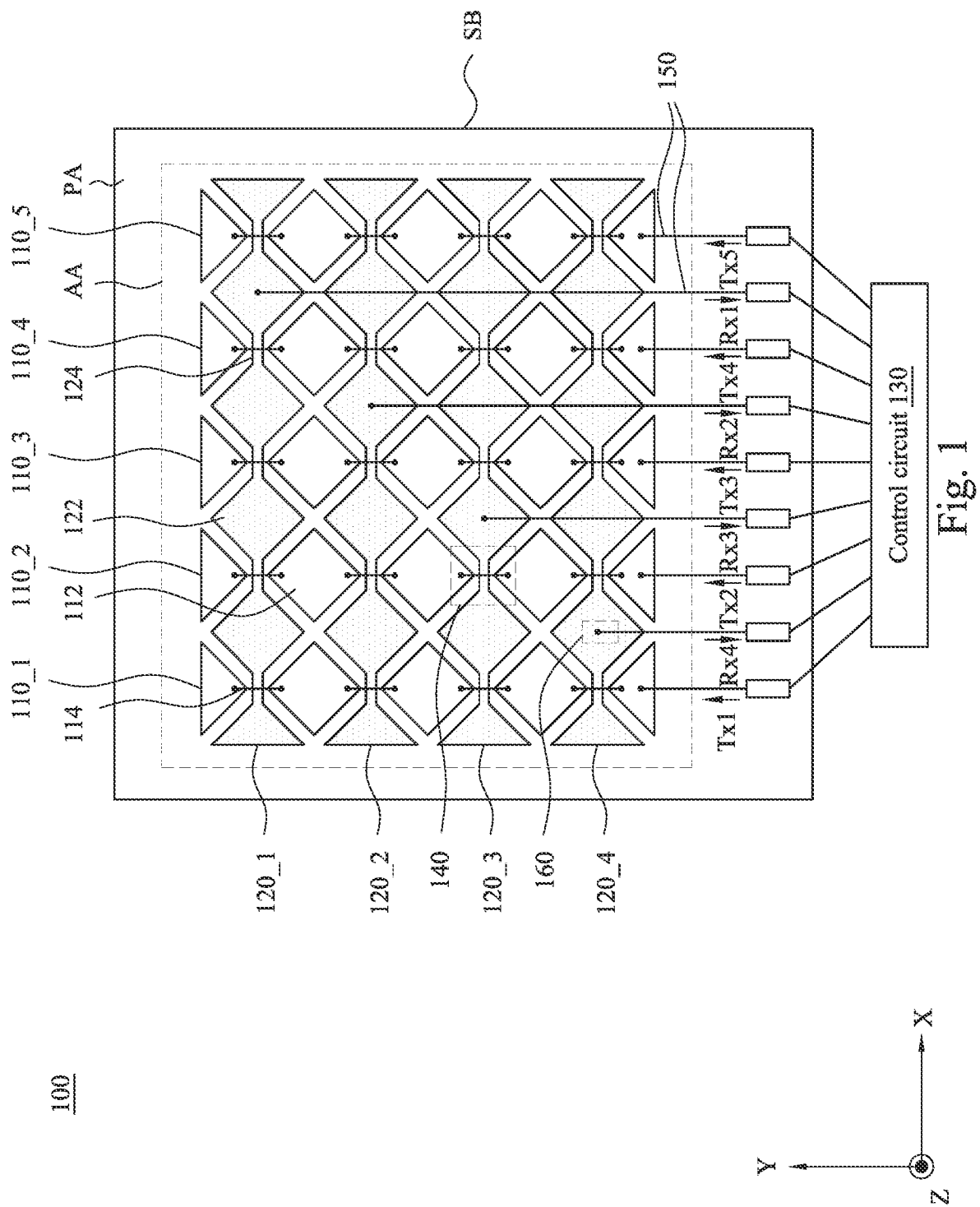
FIG. 1 is a simplified functional block diagram of an electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of an electronic device 100 according to one embodiment of the present disclosure. The electronic device 100 has a mutual-capacitance touch sensing function and comprises first touch electrodes 110_1-110_5, second touch electrodes 120_1-120_4, a control circuit 130, and a substrate SB. The first touch electrodes 110_1-110_5 are in parallel with a Y-axis and are arranged sequentially along an X-axis. The second touch electrodes 120_1-120_4 are in parallel with the X-axis and are arranged sequentially along the Y-axis, in which the X-axis is substantially perpendicular to the Y-axis. The first touch electrodes 110_1-110_5 and the second touch electrodes 120_1-120_4 intersect with each other. That is, each of the first touch electrodes 110_1-110_5 intersects the second touch electrodes 120_1-120_4, and each of the second touch electrodes 120_1-120_4 intersects the first touch electrodes 110_1-110_5.

The control circuit 130 is configured to transmit scan signals Tx1-Tx5 to the first touch electrodes 110_1-110_5, respectively, and configured to receive sensing signals Rx1-Rx4 from the second touch electrodes 120_1-120_4, respectively. When a touch input (e.g., a finger of a user or a stylus) is moved close to the electronic device 100, mutual capacitance between the first touch electrodes 110_1-110_5 and the second touch electrodes 120_1-120_4 changes, in which magnitude of the sensing signals Rx1-Rx4 reflects the changes of the mutual capacitance. Therefore, the control circuit 130 can calculate positions, on the X-axis and the Y-axis, of the touch input according to the sensing signals Rx1-Rx4.

In some embodiments, the electronic device 100 further comprises various elements for realizing display function, such as one or more of a scan driving circuit, a back light module, or pixel circuits. For the sake of brevity, these elements and their connection relationship are not shown in FIG. 1. When looking down at the electronic device 100 along a Z-axis, the first touch electrodes 110_1-110_5, the second touch electrodes 120_1-120_4, and the pixel circuits are located in an active area AA on the substrate SB, in which the Z-axis is substantially perpendicular to the X-axis and the Y-axis. The active area AA may be an area in which the electronic device 100 displays pictures to the user, and another area of the substrate SB surrounding the active area AA is a peripheral area PA. The peripheral area PA may be used to dispose the scan driving circuit for supplying control signals to drive the pixel circuits. The technologies of the scan driving circuit are well-known to one of ordinary skill in the art, and thus a description of the scan driving circuit is omitted here for the sake of brevity.

In some embodiments, the electronic device 100 may be implemented by a smart phone, a tablet, or a notebook computer or may be implemented by an in-cell touch display disposed in these devices.

Notably, the number of the first touch electrodes 110_1-110_5 and the number of the second touch electrodes 120_1-120_4 of FIG. 1 are merely examples. In some embodiments, the number of the first touch electrodes 110_1-110_5 and the number of the second touch electrodes 120_1-120_4 may be adjusted based on practical requirements to adapt to panels with different sizes or different resolutions.

In the embodiment of FIG. 1, the control circuit 130 is disposed external to the substrate SB and may be coupled with the substrate SB through chip on film (COF) technology, but this disclosure is not limited thereto. In other embodiments, the control circuit 130 may be disposed on the substrate SB through chip on glass (COG) technology.

Reference is made again to FIG. 1. Each of the first touch electrodes 110_1-110_5 comprises a plurality of first electrode blocks 112 and a plurality of bridge patterns 114. The plurality of first electrode blocks 112 are coupled with the plurality of bridge patterns 114 in series. That is, two adjacent first electrode blocks 112 are coupled with each other through a bridge pattern 114. Each of the second touch electrodes 120_1-120_4 comprises a plurality of second electrode blocks 122 and a plurality of connection patterns 124. The plurality of second electrode blocks 122 and the plurality of connection patterns 124 are connected in series. That is, two adjacent second electrode blocks 122 are coupled with each other through a connection pattern 124. Along the Z-axis, each bridge pattern 114 intersects a corresponding connection pattern 124. The first electrode blocks 112, the second electrode blocks 122, and the connection patterns 124 are disposed on the same layer on the substrate SB, and the bridge pattern 114 is disposed on another layer on the substrate SB. In the later-described FIG. 2, the area 140 of FIG. 1 will be enlarged to explain the aforesaid stacked relationship in detail.

Each first electrode block 112 and each second electrode block 122 are substantially rectangular or diamond-shaped, but this disclosure is not limited thereto. In some embodiments, the first electrode blocks 112 at two terminals (e.g., the head and the end) of each of the first touch electrodes 110_1-110_5 are substantially triangular, and the second electrode blocks 122 at two terminals (e.g., the head and the end) of each of the second touch electrodes 120_1-120_4 are also substantially triangular. In other embodiments, the plurality of first electrode blocks 112 are electrically isolated from the plurality of second electrode blocks 122. In yet other embodiments, the plurality of first electrode blocks 112 and the plurality of second electrode blocks 122 may be implemented by various suitable transparent conductive films, such as indium tin oxide (ITO) film or aluminum doped zinc oxide (AZO) film.

In the embodiment of FIG. 1, the electronic device 100 further comprises a plurality of signal transmission patterns 150. Each of the first touch electrodes 110_1-110_5 is coupled with the signal transmission patterns 150 through the first electrode block 112 at the end and receives one of the scan signals Tx1-Tx5 through the signal transmission pattern 150. Each of the second touch electrodes 120_1-120_4 is coupled with the signal transmission pattern 150 through a corresponding second electrode block 122 and transmits one of the sensing signals Rx1-Rx4 through the signal transmission pattern 150. For example, the second touch electrode 120_1 is coupled with the signal transmission pattern 150 through the second ($2^{nd}$) second electrode block 122 thereof counted from the right of FIG. 1. As another example, the second touch electrode 120_2 is coupled with the signal transmission pattern 150 through the third ($3^{rd}$) second electrode block 122 thereof counted from the right of FIG. 1, and so on. However, the connections between the second touch electrodes 120_1-120_4 and the signal transmission patterns 150 are not limited thereto. In some embodiments, each of the second touch electrodes 120_1-120_4 may be coupled with the signal transmission pattern 150 through the second electrode block 122 at the head or the end. In the later-described FIG. 5, the area 160 of FIG. 1 will be enlarged to further explain the electrical connections of the first touch electrodes 110_1-110_5 and the second touch electrodes 120_1-120_4 with the signal transmission patterns 150.

Figure 2:
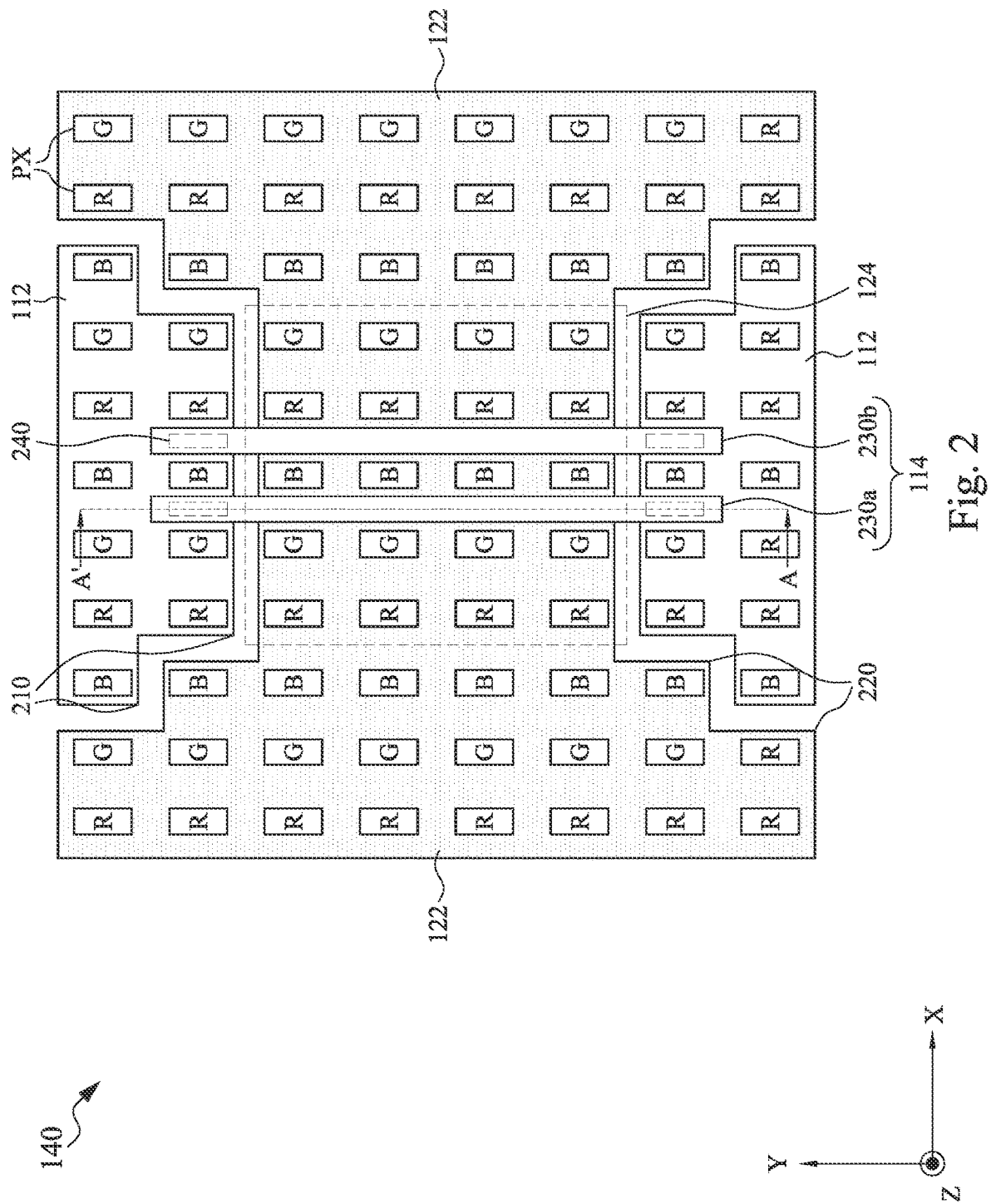
FIG. 2 is an enlarged schematic diagram of an area 140 of FIG. 1.

FIG. 2 is an enlarged schematic diagram of the area 140 of FIG. 1. In some embodiments, the pixel circuits PX are configured to receive one or more operation voltages from the first touch electrodes 110_1-110_5 and the second touch electrodes 120_1-120_4. Therefore, at least one edge of the first electrode block 112 is saw-tooth-shaped, and at least one edge of the second electrode block 122 is also saw-tooth-shaped, so as to correspond to the pixel circuits PX in a projection direction (e.g., the vertical projection direction). In FIG. 2, the symbols "R," "G," and "B" in the blocks of each pixel circuit PX respectively represent that the pixel circuit PX is configured to emit the red, green, and blue light, but the arrangements and combinations of colors of the pixel circuits PX of this disclosure is not limited thereto.

Specifically, on a plane formed by the X-axis and the Y-axis, at least one edge of the first electrode block 112 comprises a plurality of first protrusions 210, and at least one edge of the second electrode block 122 comprises a plurality of second protrusions 220. Each of the first protrusions 210 and second protrusions 220 overlaps projections projected by a corresponding one or more pixel circuits PX along the Z-axis.

In addition, in some embodiments, slits between the plurality of first electrode blocks 112 and the plurality of second electrode blocks 122 do not overlap with the projections projected by the pixel circuits PX along the Z-axis.

As shown in FIG. 2, the bridge pattern 114 comprises a plurality of bridge lines 230a-230b. The bridges lines 230a-230b are located on a layer on the substrate SB, and the first electrode block 112, the second electrode block 122, and the connection pattern 124 are located on another layer on the substrate SB. Therefore, each of the bridge lines 230a-230b is coupled with two adjacent first electrode blocks 112 through two via holes 240, respectively. The bridge lines 230a-230b intersect the connection pattern 124. In some embodiments, each of the bridge lines 230a-230b is disposed between two corresponding columns of pixel circuits PX and does not overlap with the projections projected by the pixel circuits PX along the Z-axis. In other embodiments, the bridge lines 230a-230b would not be disposed between the same two columns of pixel circuits PX, in which the bridge lines 230a-230b are separated from each other by at least one column of pixel circuits PX. Notably, the number of bridge lines of FIG. 2 is merely an example, and the bridge pattern 114 may be designed as comprising one or more bridge lines according to practical requirements.

In addition, the connection pattern 124 is used to couple two adjacent second electrode blocks 122, and edges of the connection pattern 124 may comprise no protrusion so that the connection pattern 124 is substantially rectangular. The connection pattern 124 overlaps with projections projected by some of the pixel circuits PX along the Z-axis.

Figure 3A:
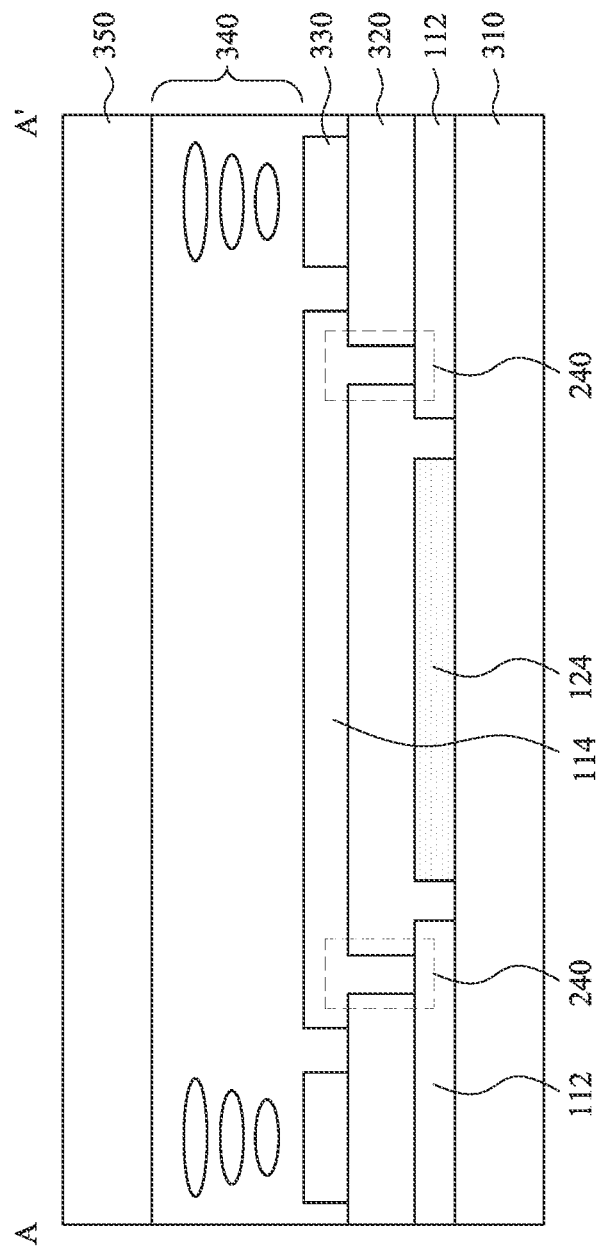
FIG. 3A is a simplified sectional view along line A-A' of FIG. 2 according to one embodiment of the present disclosure.

FIG. 3A is a simplified sectional view along line A-A' of FIG. 2 according to one embodiment of the present disclosure. In this embodiment, the pixel circuits PX are liquid crystal pixel circuits. The electronic device 100 comprises, from bottom to top, a bottom glass substrate 310, a transparent conductive film layer (comprising the first electrode blocks 112, the second electrode blocks 122 and the connection patterns 124), an insulating layer 320, a thin-film transistor layer 330 (comprising the bridge pattern 114), a liquid crystal layer 340, and a top glass substrate 350. The via hole 240 penetrates the insulating layer 320 so that the bridge pattern 114 is electrically coupled with the first electrode blocks 112. The first touch electrodes 110_1-110_5 and the second touch electrodes 120_1-120_4 together form a common electrode layer of the pixel circuits PX. The common electrode layer is configured to supply one or more common voltages to the pixel circuits PX, in which the one or more common voltages are used for polarity inversion driving and are related to the grayscales provided by the pixel circuits PX.

Figure 3B:
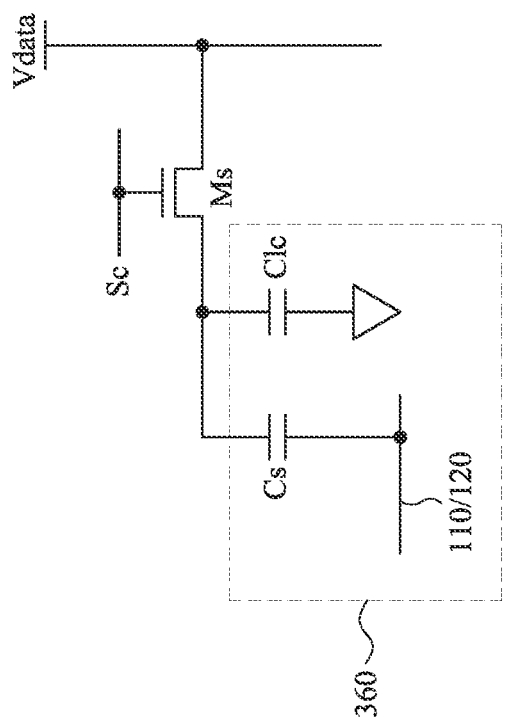
FIG. 3B is a functional block diagram of a pixel circuit according to one embodiment of the present disclosure.

Each of the pixel circuits PX may comprise one or more switch transistors and a brightness control circuit, in which the brightness control circuit is configured to control the grayscale provided by the pixel circuit PX and is coupled with a corresponding one of the first touch electrodes 110_1-110_5 or a corresponding one of the second touch electrodes 120_1-120_4. For example, in some embodiments, each of the pixel circuits PX may be implemented as the pixel circuit 300 of FIG. 3B. The pixel circuit 300 comprises one or more switch transistors Ms and a brightness control circuit 360, in which the brightness control circuit 360 comprises a storage capacitor Cs and a liquid crystal capacitor Clc. The switch transistor Ms is configured to be selectively conducted or switched off by a control signal Sc to write a data voltage Vdata in the storage capacitor Cs and the liquid crystal capacitor Clc. A first terminal of the storage capacitor Cs is coupled with the liquid crystal capacitor Clc and the switch transistor Ms, and a second terminal of the storage capacitor Cs is coupled with the corresponding one of the first touch electrodes 110_1-110_5 or the corresponding one of the second touch electrodes 120_1-120_4. In FIG. 3B, for the sake of brevity, the corresponding one of the first touch electrodes 110_1-110_5 and the corresponding one of the second touch electrodes 120_1-120_4 are labeled as "110" and "120," respectively.

In the foregoing embodiment of FIG. 2, when looking down along the electronic device 100 along the Z-axis, the bridge pattern 114 is above the first electrode blocks 112, the second electrode blocks 122, and the connection pattern 124, but this disclosure is not limited thereto.

Figure 4A:
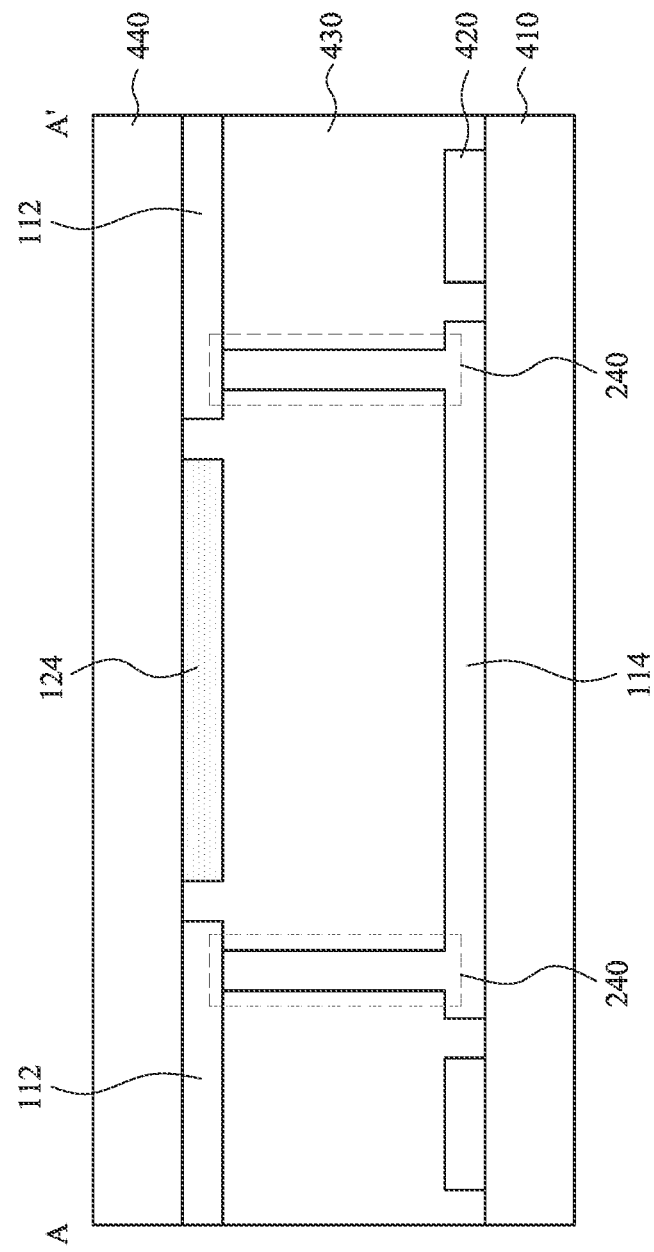
FIG. 4A is a simplified sectional view along line A-A' of FIG. 2 according to another embodiment of the present disclosure.

In some embodiments, when looking down the electronic device 100 along the Z-axis, the bridge pattern 114 is beneath the first electrode blocks 112, the second electrode blocks 122, and the connection pattern 124. In this situation, a sectional view along line A-A' of FIG. 2 is shown in 4A. In the embodiment of 4A, the pixel circuits PX are organic light-emitting diode (OLED) pixel circuits. The electronic device 100 comprises, from bottom to top, a bottom substrate 410, a thin-film transistor layer 420 (comprising the bridge pattern 114), an insulating layer 430, a transparent conductive film layer (comprising the first electrode blocks 112, the second electrode blocks 122, and the connection patterns 124), and a top substrate 440. The via holes 240 penetrate the insulating layer 430 so that the bridge pattern 114 is electrically coupled with the first electrode blocks 112. The first touch electrodes 110_1-110_5 and the second touch electrodes 120_1-120_4 are coupled with anodes or cathodes of OLEDs (not shown in FIG. 4A) of the pixel circuits PX. The first touch electrodes 110_1-110_5 and the second touch electrodes 120_1-120_4 are also configured to supply one or more driving voltages to the pixel circuits PX, in which the one or more driving voltages are related to the grayscales provided by the pixel circuits PX.

Figure 4B:
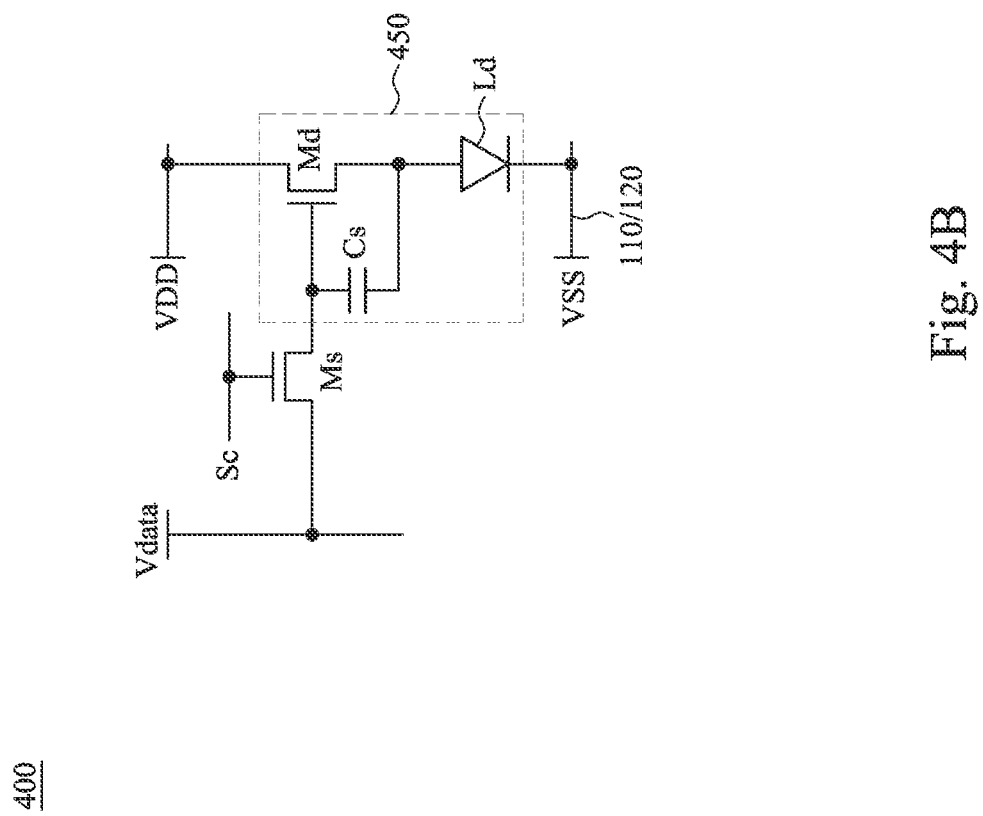
FIG. 4B is a functional block diagram of a pixel circuit according to another embodiment of the present disclosure.

For example, in some embodiments, each of the pixel circuits PX may be implemented by the pixel circuit 400 of FIG. 4B. The pixel circuit 400 comprises one or more switch transistors Ms and a brightness control circuit 450, in which the brightness control circuit 450 comprises a driving transistor Md, a storage capacitor Cs, and an OLED Ld. The driving transistor Md has a first terminal configured to receive a driving voltage VDD and has a second terminal coupled with the anode of the OLED Ld, in which a control terminal of the driving transistor Md is coupled with the switch transistor Ms and the storage capacitor Cs. The switch transistor Ms is configured to be selectively conducted or switched off according to the control signal Sc so as to write the data voltage Vdata in the storage capacitor Cs. The cathode of the OLED Ld is coupled with the corresponding one of the first touch electrodes 110_1-110_5 or the corresponding one of the second touch electrodes 120_1-120_4 so as to receive a driving voltage VSS. In FIG. 4B, for the sake of brevity, the corresponding one of the first touch electrodes 110_1-110_5 and the corresponding one of the second touch electrodes 120_1-120_4 are labeled as "110" and "120," respectively.

In other embodiments, the pixel circuit 400 may be coupled with the corresponding one of the first touch electrodes 110_1-110_5 or the corresponding one of the second touch electrodes 120_1-120_4 through the anode of the OLED Ld to receive the driving voltage VDD. In this situation, the cathode of the OLED Ld is coupled with the first terminal of the driving transistor Md, and the second terminal of the driving transistor Md is configured to receive the driving voltage VSS.

Figure 5:
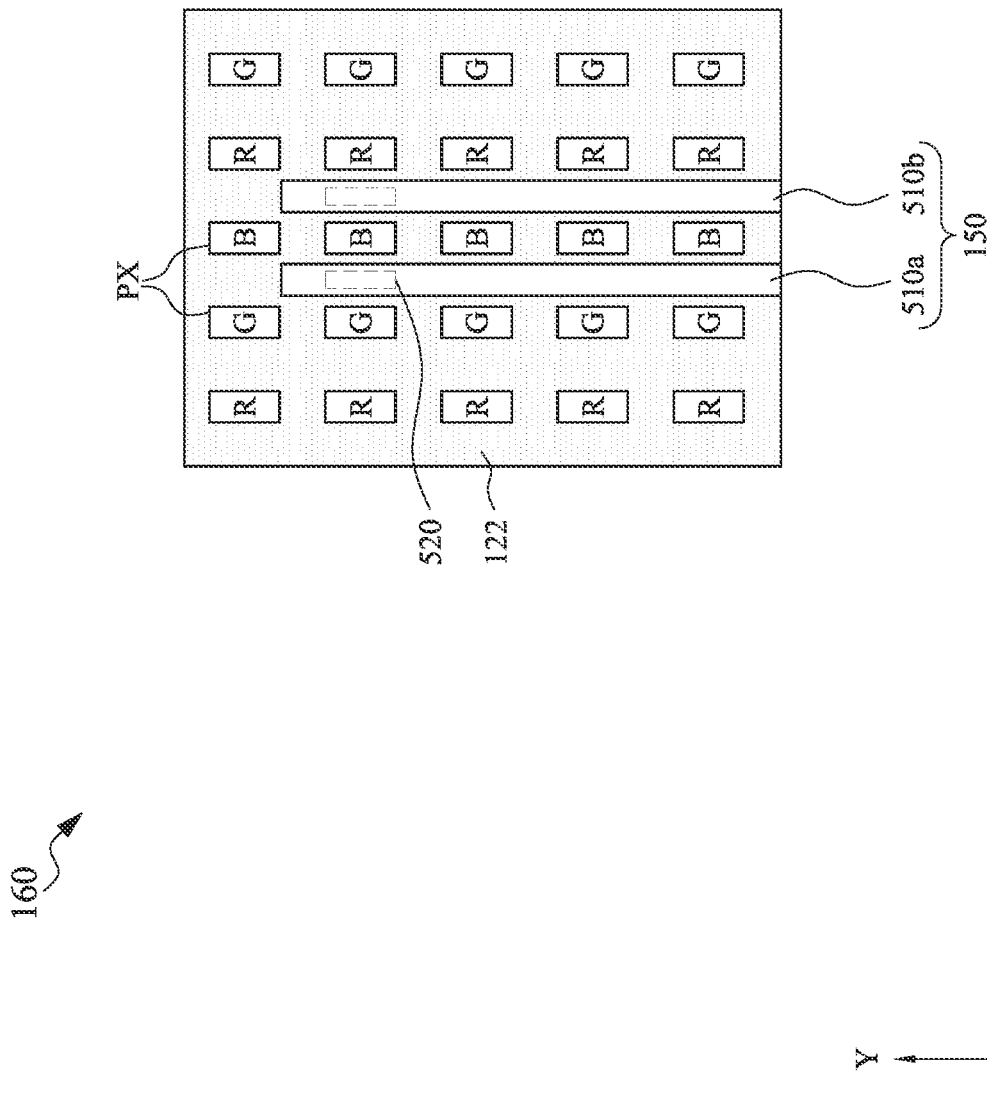
FIG. 5 is an enlarged schematic diagram of another area 160 of FIG. 1.

Reference is made to FIGS. 1 and 5. FIG. 5 is an enlarged schematic diagram of the area 160 of FIG. 1. As shown in FIG. 5, the signal transmission pattern 150 comprises signal transmission lines 510a-510b. The signal transmission lines 510a-510b and the second electrode block 122 (and also the first electrode block 112 and the connection pattern 124) are disposed in different layers, and thus the signal transmission lines 510a-510b are coupled with the second electrode block 122 through respective via holes 520. In some embodiments, each of the signal transmission lines 510a-510b is disposed between two corresponding columns of pixel circuits PX and does not overlap with the projections projected by the pixel circuits PX along the Z-axis. In other embodiments, the signal transmission lines 510a-510b would not be disposed between the same two columns of pixel circuits PX, in which the signal transmission lines 510a-510b are separated from each other by at least one column of pixel circuits PX. Notably, the number of signal transmission lines in FIG. 5 is merely an example, and the signal transmission pattern 150 may comprise one or more signal transmission lines according to practical design requirements.

The connections between the second electrode block 122 and the signal transmission pattern 150 are also applicable to connections between the first electrode block 112 and the signal transmission pattern 150. For the sake of brevity, those descriptions will not be repeated here.

Figure 6:
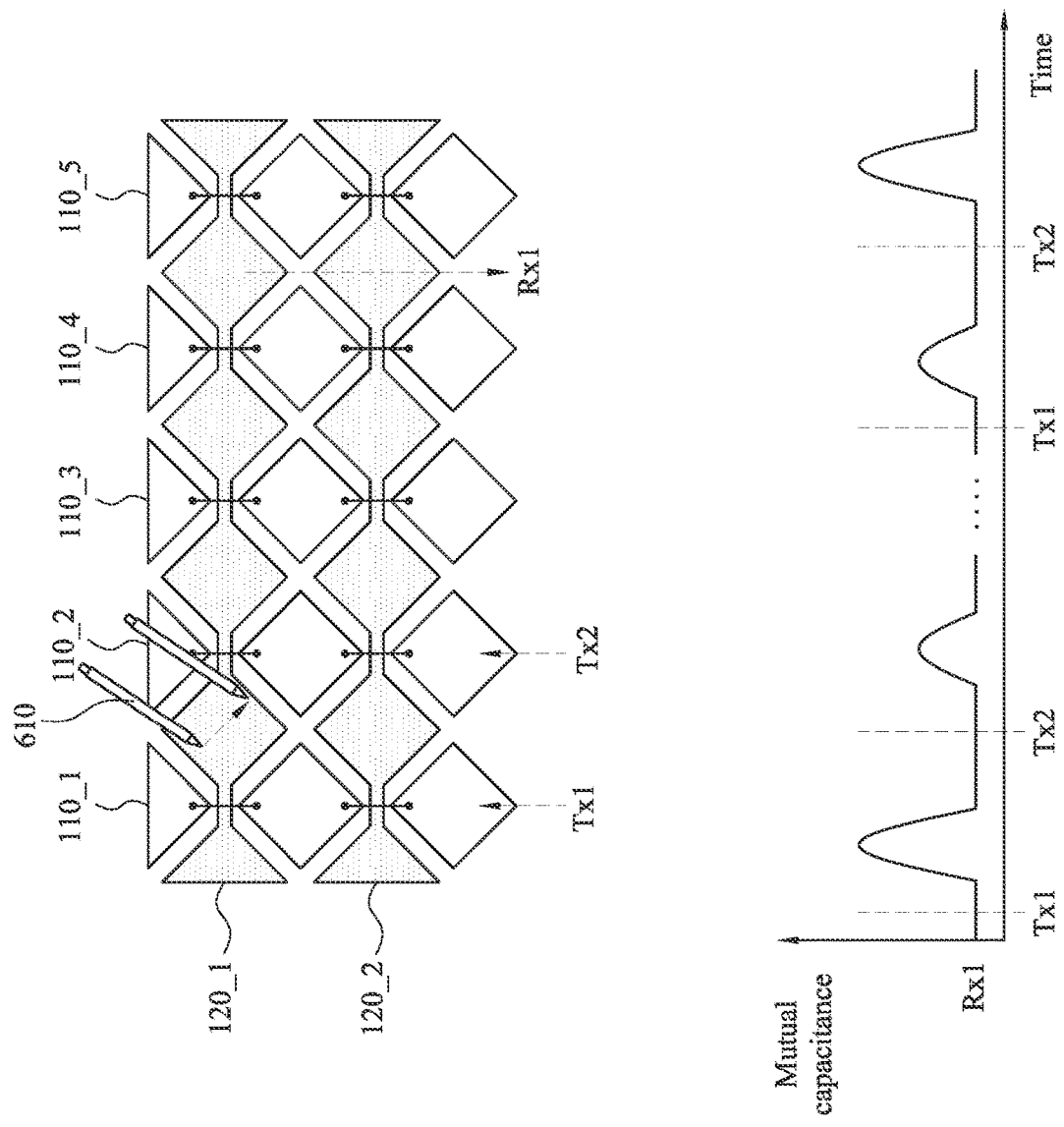
FIG. 6 is a waveform schematic of the electronic device when receiving touch input.

FIG. 6 is a waveform schematic of the electronic device 100 when receiving a touch input. For explanation convenience, only a portion of the touch electrodes are shown in FIG. 6. In this embodiment, the touch input is caused by a stylus 610 close to the electronic device 100. The stylus 610 is moved above the second touch electrode 120_1 and is moved from a location close to the first touch electrode 110_1 to another location close to the first touch electrode 110_2.

In the situation in which the stylus 610 is close to the first touch electrode 110_1, when the control circuit 130 sequentially transmits the scan signals Tx1-Tx2 to the first touch electrodes 110_1-110_2, the control circuit 130 receives the sensing signal Rx1 that sequentially provides a pulse with high magnitude and a pulse with low magnitude. On the other hand, in the situation in which the stylus 610 is close to the first touch electrode 110_2, when the control circuit 130 again sequentially transmits the scan signals Tx1-Tx2 to the first touch electrodes 110_1-110_2, the control circuit 130 receives the sensing signal Rx1 that sequentially provides a pulse with low magnitude and a pulse with high magnitude. Therefore, the control circuit 130 can precisely determine the track of the stylus 610 according to waveforms of the sensing signal Rx1.

As can be appreciated from the foregoing descriptions, one of the advantages of the electronic device 100 is that the electronic device 100 solves the problem of the stylus not able to be used with conventional array-arrangement rectangle touch electrodes. Other advantage of the electronic device 100 is that the electronic device 100 significantly reduces the number of signal transmission patterns 150 from the touch electrodes to the control circuit 130, thereby helping simplify a design process of touch sensing chips and also helping reduce risk of short circuits between the touch electrodes to increase reliability of products.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The size and relative sizes of some of the elements shown in drawings may be enlarged, or the shapes of some of the elements may be simplified so that the contents of the embodiments can be more clearly expressed. Therefore, the shapes, sizes, relative sizes, and relative positions of the various elements in the drawings are merely illustrative and should not be used to limit the scope of the claims of the present disclosure. In addition, the present disclosure may be embodied in many different forms, and the explanation of the present disclosure should not be limited to the embodiments provided by the present disclosure.

In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. An electronic device with touch sensing function, comprising
    a plurality of first touch electrodes in parallel with a Y-axis, wherein each first touch electrode of the plurality of first touch electrodes comprises a plurality of first electrode blocks and a plurality of bridge patterns, the plurality of first electrode blocks are coupled with the plurality of bridge patterns in series, at least one edge of each first electrode block of the plurality of first electrode blocks is saw-tooth-shaped, and the at least one edge of each first electrode block of the plurality of first electrode blocks comprises a plurality of first protrusions;
    a plurality of second touch electrodes in parallel with an X-axis, wherein each second touch electrode of the plurality of second touch electrodes comprises a plurality of second electrode blocks and a plurality of connection patterns, the plurality of second electrode blocks are coupled with the plurality of connection patterns in series, at least one edge of each second electrode block of the plurality of second electrode blocks is saw-tooth-shaped, the at least one edge of each second electrode block of the plurality of second electrode blocks comprises a plurality of second protrusions, and the X-axis is substantially perpendicular to the Y-axis; and
    a plurality of pixel circuits corresponding to the plurality of first touch electrodes and the plurality of second touch electrodes in a projection direction, wherein the plurality of pixel circuits are configured to receive one or more voltages from the plurality of first touch electrodes and the plurality of second touch electrodes, each first protrusion of the plurality of first protrusions and each second protrusion of the plurality of second protrusions overlap with projections projected by a corresponding one or more of the plurality of pixel circuits along a Z-axis, and the Z-axis is substantially perpendicular to the X-axis and the Y-axis.

2. The electronic device of claim 1, wherein slits between the plurality of first electrode blocks and the plurality of second electrode blocks do not overlap with projections projected by the plurality of pixel circuits along the Z-axis.

3. The electronic device of claim 1, wherein each connection pattern of the plurality of connection patterns overlaps with projections projected by corresponding ones of the plurality of pixel circuits along the Z-axis, and each connection pattern of the plurality of connection patterns intersects a corresponding one of the plurality of bridge patterns.

4. The electronic device of claim 1, wherein each bridge pattern of the plurality of bridge patterns comprises one or more bridge lines, each bridge line of the one or more bridges lines is disposed between two corresponding columns of pixel circuits of the plurality of pixel circuits, and each bridge line of the one or more bridges lines intersects a corresponding one of the plurality of connection patterns.

5. The electronic device of claim 1, wherein:
the plurality of pixel circuits are liquid crystal pixel circuits, and the plurality of first touch electrodes and the plurality of second touch electrodes form a common electrode layer of the plurality of pixel circuits, or
the plurality of pixel circuits are organic light-emitting diode (OLED) pixel circuits, and the plurality of first touch electrodes and the plurality of second touch electrodes are coupled with OLEDs of the plurality of pixel circuits.

6. The electronic device of claim 5, wherein the one or more voltages are related to brightness of each pixel circuit of the plurality of pixel circuits.

7. The electronic device of claim 1, further comprising a substrate, wherein the plurality of first electrode blocks, the plurality of second electrode blocks, and the plurality of connection patterns are disposed on a first layer on the substrate, and the plurality of bridge patterns are disposed on a second layer, different from the first layer, on the substrate.

8. The electronic device of claim 1, further comprising:
a plurality of signal transmission patterns configured to be coupled with a control circuit, wherein each signal transmission pattern of the plurality of signal transmission patterns is coupled with a corresponding one of the plurality of first touch electrodes or a corresponding one of the plurality of second touch electrodes and comprises one or more signal transmission lines, and each signal transmission line of the one or more signal transmission lines is disposed between two corresponding columns of pixel circuits of the plurality of pixel circuits.

9. The electronic device of claim 8, wherein the plurality of signal transmission patterns are in parallel with the Y-axis.

10. The electronic device of claim 1, wherein the plurality of first electrode blocks and the plurality of second electrode blocks are substantially diamond-shaped.

11. An electrode structure for touch sensing, comprising:
a plurality of first touch electrodes in parallel with a Y-axis, wherein each first touch electrode of the plurality of first touch electrodes comprises a plurality of first electrode blocks and a plurality of bridge patterns, the plurality of first electrode blocks are coupled with the plurality of bridge patterns in series, at least one edge of each first electrode block of the plurality of first electrode blocks is saw-tooth-shaped, and the at least one edge of each first electrode block of the plurality of first electrode blocks comprises a plurality of first protrusions; and
a plurality of second touch electrodes in parallel with an X-axis, wherein each second touch electrode of the plurality of second touch electrodes comprises a plurality of second electrode blocks and a plurality of connection patterns, the plurality of second electrode blocks are coupled with the plurality of connection patterns in series, at least one edge of each second electrode block of the plurality of second electrode blocks is saw-tooth-shaped, the at least one edge of each second electrode block of the plurality of second electrode blocks comprises a plurality of second protrusions, and the X-axis is substantially perpendicular to the Y-axis,
wherein when the plurality of first touch electrodes and the plurality of second touch electrodes are configured to provide one or more voltages to a plurality of pixel circuits, the plurality of first touch electrodes and the plurality of second touch electrodes are arranged as corresponding to the plurality of pixel circuits in a projection direction,
wherein each first protrusion of the plurality of first protrusions and each second protrusion of the plurality of second protrusions overlap with projections projected by a corresponding one or more of the plurality of pixel circuits along a Z-axis, and the Z-axis is substantially perpendicular to the X-axis and the Y-axis.

12. The electrode structure of claim 11, wherein each connection pattern of the plurality of connection patterns overlaps with projections projected by corresponding ones of the plurality of pixel circuits along the Z-axis, and each connection pattern of the plurality of connection patterns intersects a corresponding one of the plurality of bridge patterns.

13. The electrode structure of claim 11, wherein each bridge pattern of the plurality of bridge patterns comprises one or more bridge lines, each bridge line of the one or more bridges lines is disposed between two corresponding columns of pixel circuits of the plurality of pixel circuits, and each bridge line of the one or more bridges lines intersects a corresponding one of the plurality of connection patterns.

14. The electrode structure of claim 11, wherein:
the plurality of pixel circuits are liquid crystal pixel circuits, and the plurality of first touch electrodes and the plurality of second touch electrodes are configured to form a common electrode layer of the plurality of pixel circuits, or
the plurality of pixel circuits are organic light-emitting diode (OLED) pixel circuits, and the plurality of first touch electrodes and the plurality of second touch electrodes are configured to be coupled with OLEDs of the plurality of pixel circuits.

15. The electrode structure of claim 14, wherein the one or more voltages are related to brightness of each pixel circuit of the plurality of pixel circuits.

16. The electrode structure of claim 11, further comprising:
a plurality of signal transmission patterns configured to be coupled with a control circuit, wherein each signal transmission pattern of the plurality of signal transmission patterns is coupled with a corresponding one of the plurality of first touch electrodes or a corresponding one of the plurality of second touch electrodes and comprises one or more signal transmission lines, and each signal transmission line of the one or more signal transmission lines is configured to be disposed between two corresponding columns of pixel circuit of the plurality of pixel circuits.

17. The electrode structure of claim 16, wherein the plurality of signal transmission patterns are in parallel with the Y-axis.

18. The electrode structure of claim 11, wherein the plurality of first electrode blocks and the plurality of second electrode blocks are substantially diamond-shaped.

19. The electrode structure of claim 11, wherein slits between the plurality of first electrode blocks and the plurality of second electrode blocks do not overlap with projections projected by the plurality of pixel circuits along the Z-axis.

* * * * *